US006138337A

United States Patent [19]

Lezuch et al.

[11] Patent Number: 6,138,337

[45] Date of Patent: Oct. 31, 2000

[54] STRIKER ALIGNMENT CHECK FIXTURE

[75] Inventors: Lawrence J. Lezuch, Sterling Heights; Andrew R. Kavc, Rochester Hills; Gary W. Beaubien, Macomb, all of Mich.

[73] Assignee: DaimlerChrysler Corporation, Auburn Hills, Mich.

[21] Appl. No.: 09/433,433

[22] Filed: Nov. 4, 1999

[51] Int. Cl.[7] ............................ B23Q 17/00; G01D 21/00

[52] U.S. Cl. ..................................... 29/407.05; 29/407.09; 29/714; 29/720; 33/600

[58] Field of Search ............................ 29/407.05, 407.09, 29/407.1, 714, 720, 464, 271; 33/600, 608, 645

[56] References Cited

U.S. PATENT DOCUMENTS

| | | |
|---|---|---|
| 4,399,683 | 8/1983 | Hunter . |
| 4,640,015 | 2/1987 | Mason . |
| 4,744,135 | 5/1988 | Roels . |
| 4,930,337 | 6/1990 | Schaap . |
| 4,989,313 | 2/1991 | Dzurko et al. . |
| 5,282,305 | 2/1994 | Nutt et al. . |
| 5,562,001 | 10/1996 | Bell . |
| 5,653,012 | 8/1997 | Pasternak et al. . |
| 5,694,675 | 12/1997 | Pasternak et al. . |
| 6,006,635 | 12/1999 | Stojkovic et al. . |

FOREIGN PATENT DOCUMENTS

| | | |
|---|---|---|
| 10-157668 | 6/1998 | Japan . |

*Primary Examiner*—David P. Bryant
*Assistant Examiner*—Eric Compton

[57] ABSTRACT

The tool of the present invention includes a body portion, a coupling portion and a gauging portion. The coupling portion is coupled to the body portion and includes a beam member and a tool centering structure. The beam member is adapted to engage the latch ratchet of a latch mechanism and the tool centering structure is adapted to engage either the latch mechanism or the closure member to which the latch mechanism is coupled. The coupling portion maintains the body portion in a predetermined orientation relative to the latch ratchet. The gauging portion is adapted to contact a striker structure when the tool is coupled to the latch mechanism and the closure member is moved toward the closed position. Depending upon the configuration of the gauging portion, one or more indicator lights may be employed to notify the technician of the out-of-tolerance condition. Alternately, the gauging portion may be configured to permit the technician to obtain variable data on the position of the striker structure. A method for checking the alignment of a striker structure to a latch mechanism is also provided.

17 Claims, 7 Drawing Sheets

STRIKER ALIGNMENT CHECK FIXTURE

BACKGROUND OF THE INVENTION

1. Technical Field

The present invention relates generally to automotive tooling and more particularly to a tool for checking the alignment of a latch mechanism to a striker structure.

2. Discussion

Despite widespread use of striker positioning fixtures, variations in the various components which affect striker alignment have not eliminated the need to manually verify, at least on a periodic basis, the alignment of a striker structure to a latch mechanism. The primary method for evaluating striker alignment has comprised the manual opening and closing of a door structure by a technician, with the technician noting any variances in the effort to open or close the door which are attributable to the dragging of the latch mechanism on the striker structure.

As one would expect, such evaluation methods are highly subjective and plagued by problems of inaccuracy and irrepeatability. The problem is especially acute when the performance of technicians who adjust striker alignment is checked by a second individual, typically an inspector. The analysis is highly dependent upon the skill and experience of the person checking for striker alignment, and as such, different persons are likely to have different opinions as to whether a striker structure is misaligned and the degree to which the striker is misaligned.

In view of the problems with the accuracy and repeatability of these evaluation methods, it has been recognized that the data used to adjust striker structure installation fixtures (the fixtures which initially position the striker structure to the vehicle body) is of generally low quality, resulting in a highly iterative adjusting process to obtain satisfactory alignment. Furthermore, inaccuracies in this data may cause unnecessary and/or erroneous adjustment in the position of a striker structure. Consequently, there remains a need in the art for a tool and a method for checking the alignment of a striker to a latch mechanism.

SUMMARY OF THE INVENTION

It is one object of the present invention to provide a tool for accurately and repeatably determining the positional relationship between a striker structure and a latch mechanism.

It is a further object of the present invention to provide a tool for verifying the positional relationship between a striker structure and a latch mechanism is within a predetermined tolerance.

The tool of the present invention includes a body portion, a coupling portion and a gauging portion. The coupling portion is coupled to the body portion and includes a beam member and a tool centering structure. The beam member is adapted to engage the latch ratchet of a latch mechanism and the tool centering structure is adapted to engage either the latch mechanism or the closure member to which the latch mechanism is coupled. The coupling portion maintains the body portion in a predetermined orientation relative to the latch ratchet. The gauging portion is adapted to contact a striker structure when the tool is coupled to the latch mechanism and the closure member is moved toward the closed position. Depending upon the configuration of the gauging portion, one or more indicator lights may be employed to notify the technician of the out-of-tolerance condition. Alternately, the gauging portion may be configured to permit the technician to obtain variable data on the position of the striker structure. A method for checking the alignment of a striker structure to a latch mechanism is also provided.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
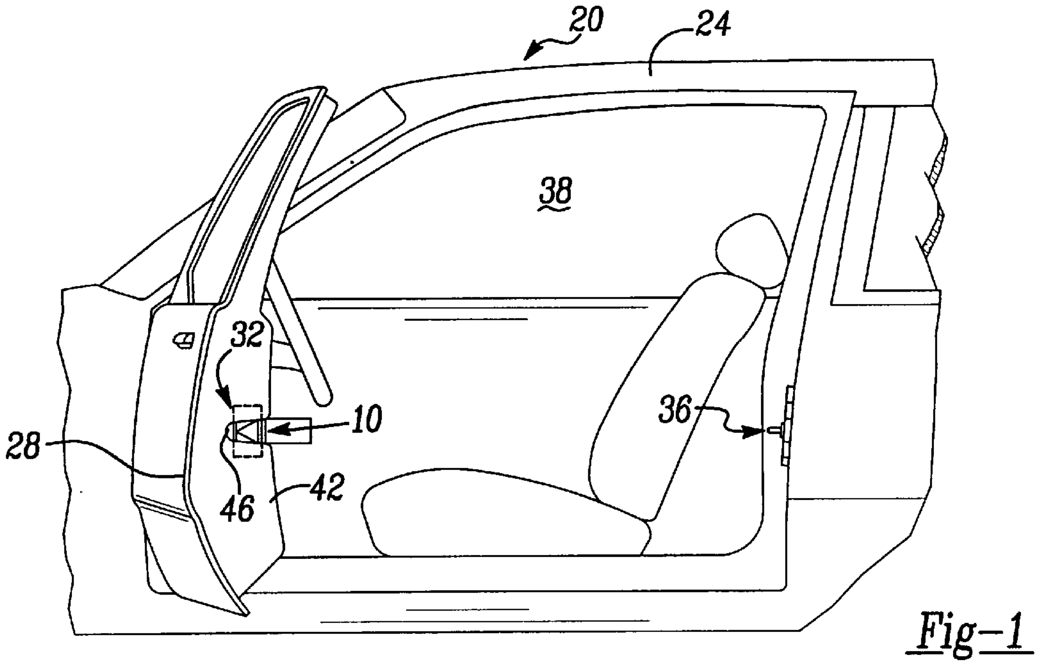
FIG. 1 is a side view of a tool constructed in accordance with the teachings of the present invention in operative association with a vehicle.
Figure 2:
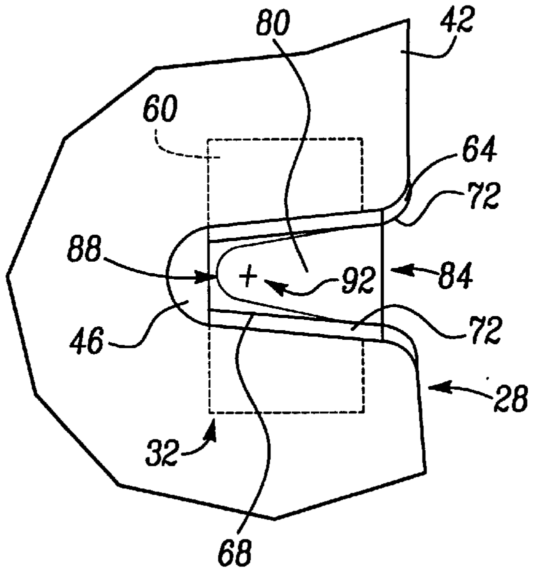
FIG. 2 is an end view of the closure member illustrated in FIG. 1.
Figure 3:
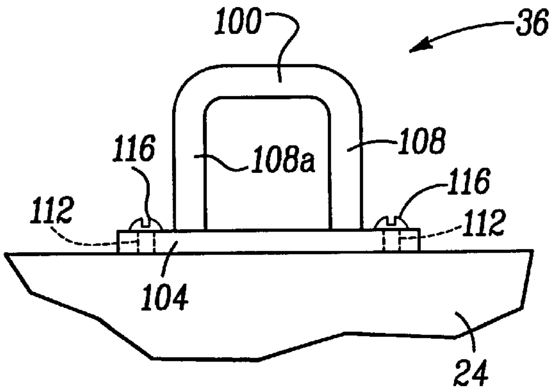
FIG. 3 is a top view of the striker structure illustrated in FIG. 1.

With reference to FIG. 1 of the drawings, a tool constructed in accordance with the teachings of a preferred embodiment of the present invention is generally indicated by reference numeral 10 and shown in operative association with a vehicle 20. With additional reference to FIGS. 2 and 3, vehicle 20 is shown to include a body structure 24, a closure member 28, a latch mechanism 32 and a striker structure 36. Body structure 24 defines an aperture 38 in the lateral side of vehicle 20. Closure member 28 is pivotably coupled to body structure 24 through a pair of hinges (not specifically shown) which permit closure member 28 to pivot between a closed position wherein closure member 28 substantially closes aperture 38, and an open position wherein closure member 28 substantially clears aperture 38. Closure member 28 includes a rear surface 42 having a latch aperture 46 adapted to receive latch mechanism 32.

Latch mechanism 32 includes a housing 60, a guide chute 64 and a latch ratchet 68. Guide chute 64 is fixedly coupled to housing 60 and includes a pair of opposed tapered guide surfaces 72. Latch ratchet 68 includes a striker aperture 80 having an open end 84 and a closed end 88. Latch ratchet 68 is rotatably coupled to housing 60 and positionable between an unlatched condition and a latched condition. Positioning of latch ratchet 68 in the unlatched condition aligns striker aperture 80 between tapered guide surfaces 72 such that striker structure 36 may be introduced into the open end 84 of striker aperture 80. Positioning of latch ratchet 68 in the latched condition positions the closed end 88 of striker aperture 80 at a predetermined location 92 relative to guide chute 64.

Striker structure 36 is illustrated as having a striker member 100 and a mounting plate 104. Striker member 100 is generally U-shaped and fixedly coupled to mounting plate 104 such that the legs 108 of striker member 100 extend perpendicularly outwardly from mounting plate 104. Mounting plate 104 includes a pair of fastener apertures 112 which permit mounting plate to be coupled to body structure 24 through a pair of conventional fasteners 116. When installed and properly aligned leg 108*a* of striker member 100 is adapted to contact only the closed end 88 of striker aperture 80 when striker structure 36 is engaged to latch ratchet 68.

Figure 4:
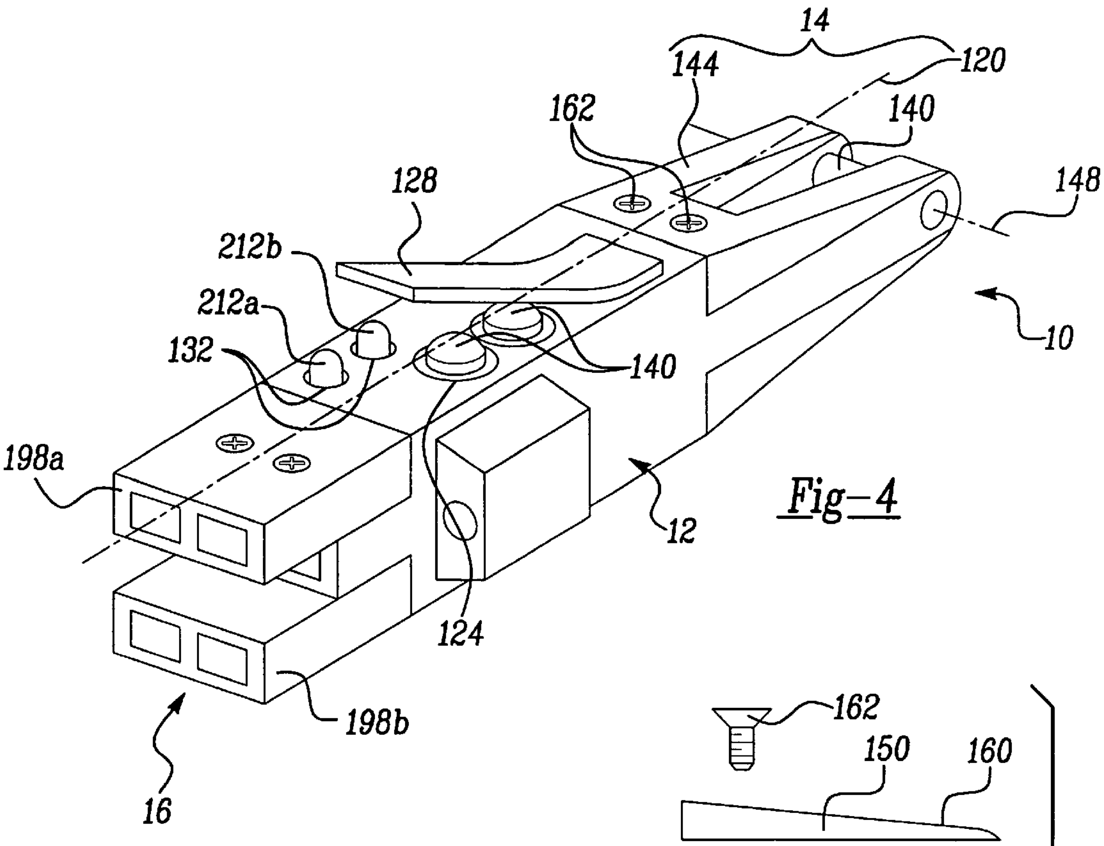
FIG. 4 is a perspective view of a tool of FIG. 1.
Figure 6:
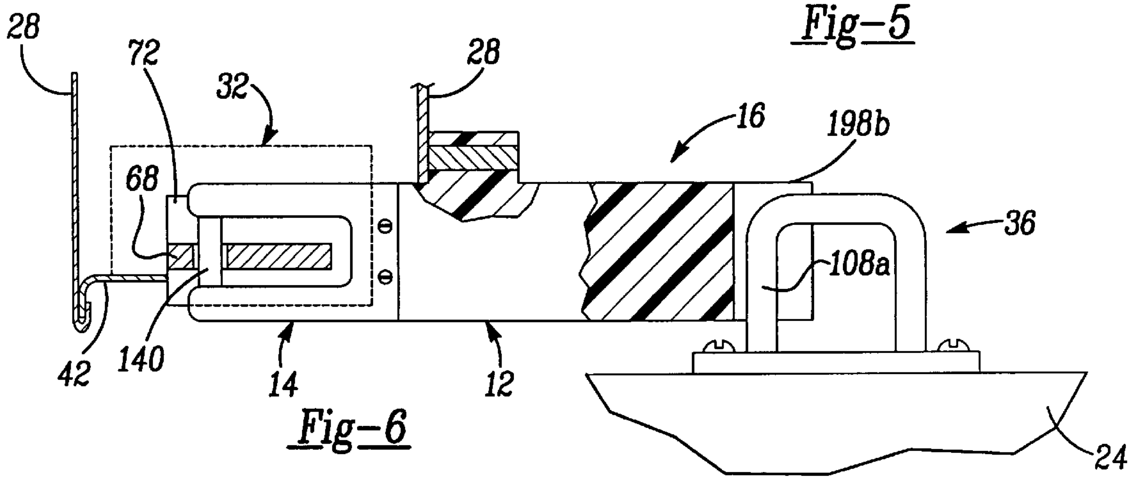
FIG. 6 is a partial cross-sectional view of the tool of FIG. 1 in operative association with a latch mechanism.
Figure 7:
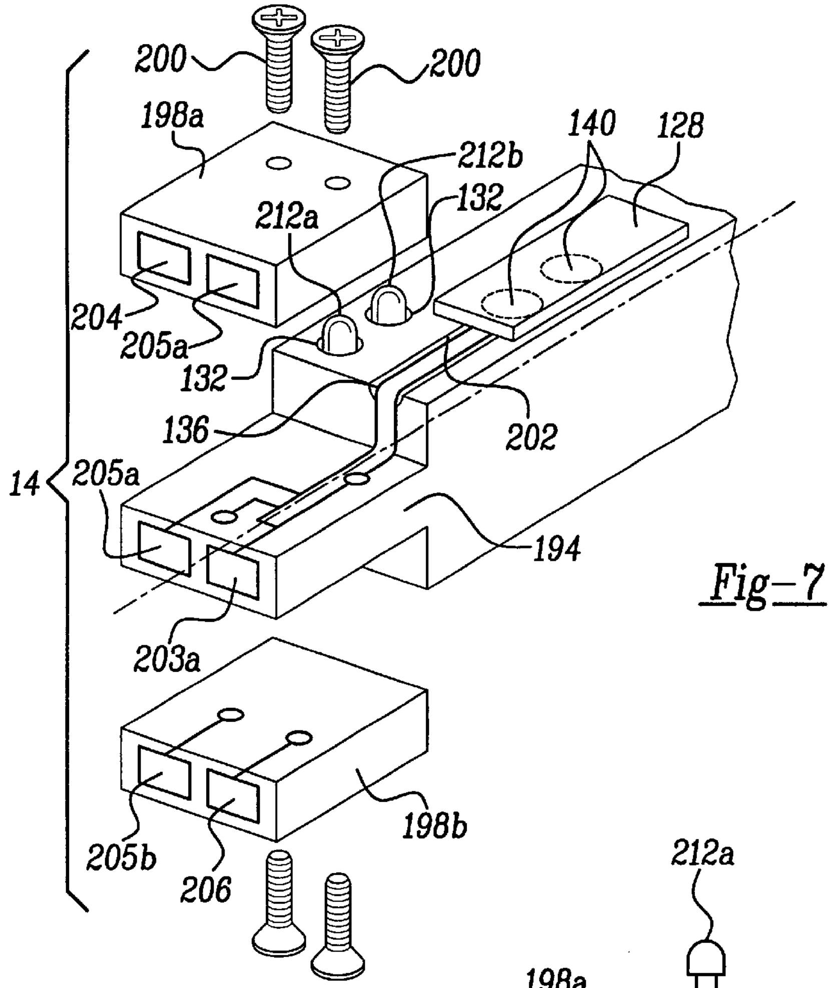
FIG. 7 is an exploded perspective view of a portion of the tool of FIG. 1.
Figure 8:
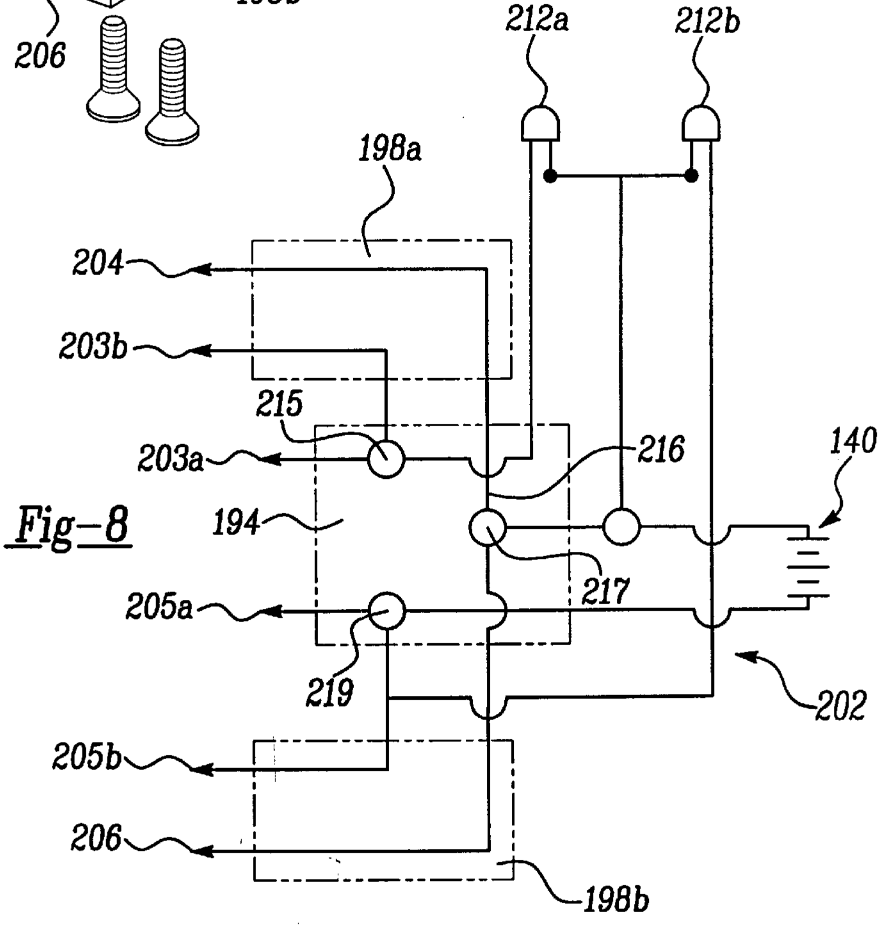
FIG. 8 is a schematic diagram of the electrical circuit for the tool of FIG. 1.
Figure 9A:
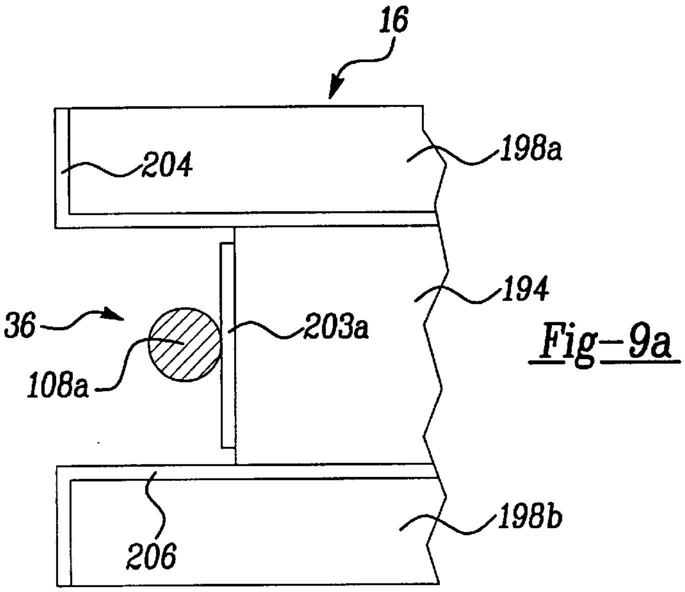
FIGS. 9*a* through 9*c* are end views of the tool of FIG. 1 in operative association with the striker structure.
Figure 9B:
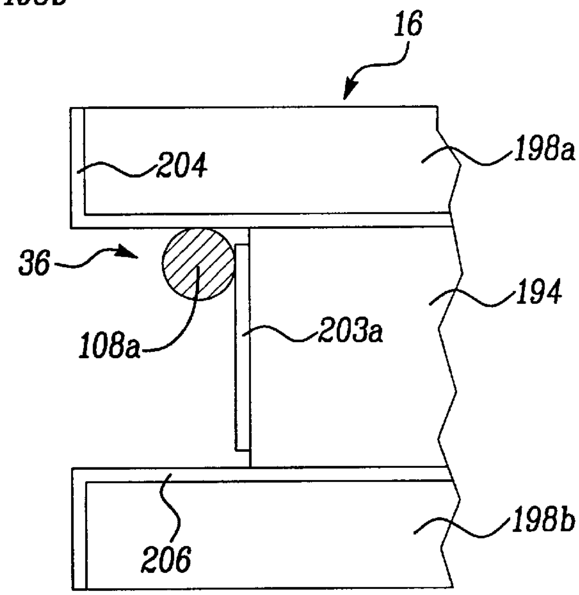
Figure 9C:
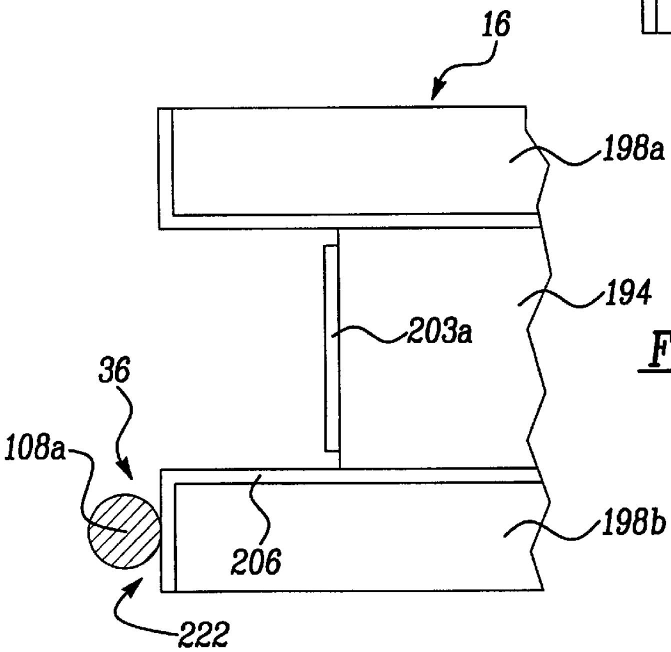

In FIGS. 4, 6 and 7, tool 10 is shown to have a body portion 12, a coupling portion 14 and a gauging portion 16. Body portion 12 is shown to include a member having a primary axis 120, a battery cavity 124, a battery cover 128, a pair of indicator apertures 132 and a wiring aperture 136. Battery cavity 124 is sized to receive one or more batteries, such as watch batteries 140, the purpose of which will be discussed in further detail, below. Body portion 12 is preferably formed from a light weight wear-resistant structural material, such as DELRIN®, which is adapted to prevent tool 10 from scratching or marring the finish of a vehicle when tool 10 is being used.

Figure 5:
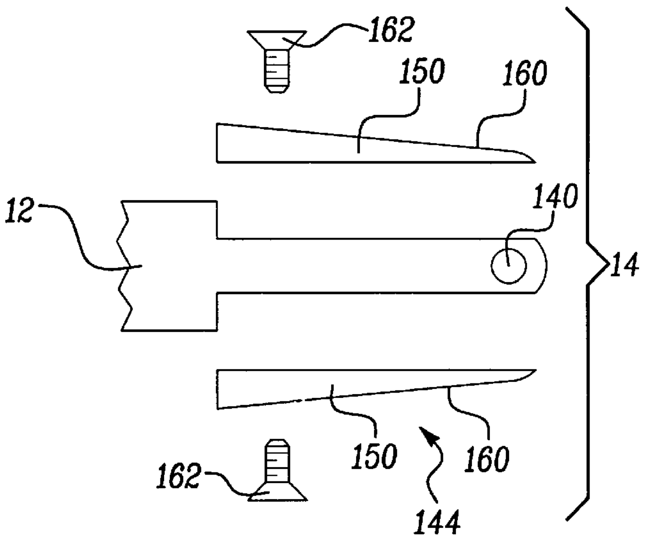
FIG. 5 is an exploded side view of a portion of the tool of FIG. 1.

With reference to FIGS. 4 through 6, coupling portion 14 is shown to include a beam member 140 and a tool centering structure 144. Beam member 140 is constructed similar to leg 108*a* and is adapted to simulate leg 108*a* to permit coupling portion 14 to engage a latch ratchet 68. Sufficient insertion of beam member 140 into striker aperture 80 causes latch ratchet 68 to rotate in housing 60 into the latched condition and align the longitudinal axis 148 of beam member 140 to the predetermined location 92 at which the closed end 88 of striker aperture is positioned.

Tool centering structure 144 includes a pair of latch centering members 150, each having an engagement surface 160 which tapers inwardly from body portion 12 toward longitudinal axis 148. Latch centering members 150 are fixedly but removably coupled to body portion 12 through a pair of conventional threaded fasteners 162. Each of the engagement surfaces 160 is adapted to contact one of the tapered guide surfaces 72 of guide chute 64 when tool 10 is engaged to latch ratchet 68. More specifically, engagement of beam member 140 to latch ratchet 68 draws tool centering structure 144 into guide chute 64 and brings the each of the engagement surfaces 160 into contact with their associated tapered guide surface 72. Beam member 140 and engagement surfaces 160 therefore cooperate to align the primary axis 120 of body portion 12 to latch mechanism 32 in a predetermined manner. It is anticipated that due to wear or tolerances associated with the various components that latch centering members 150 may need to be replaced or shimmed vertically outward from longitudinal axis 148 from time to time. Coupling portion 14 also includes a magnet housing 168 and a magnet 172 which magnetically couples body portion 12 to closure member 28. Alternately, tool centering structure 144 may align tool 10 to the latch aperture 46 in the rear surface 42 of closure member 28.

In FIGS. 4 and 7 through 9, gauging portion 16 is adapted to contact the striker structure 36 when tool 10 is coupled to latch mechanism 32 and closure member 28 is moved toward the closed position. In the particular embodiment illustrated, gauging portion 16 includes a generally U-shaped structure having a central portion 194 and a pair of fork members 198. The fork members 198 are preferably fixedly but removably coupled to opposite sides of central portion 194 with a plurality of conventional fasteners 200. Fork members 198 are positioned relative to primary axis 120 to contact striker structure 36 if striker structure 36 is offset to primary axis 120 an amount which exceeds a predetermined offset tolerance.

Gauging portion 16 also includes batteries 140, a wiring harness 202, a pair of first negative contacts 203, a first positive contact 204, a pair of second negative contacts 205, a second positive contact 206 and at least one indicator, such as indicator lights 212. Indicator lights 212 may be light-emitting diodes and are each disposed at least partially within one of the indicator apertures 132. Each of the electrical contacts 203, 204, 205 and 206 is formed from an electrically conductive material and is resiliently biased in a direction away from body portion 12.

Wiring harness 202 is coupled to batteries 140 and indicator lights 212 at a first end. A first portion of wire harness 202 extends from indicator light 212*a* through wire harness aperture 136 where a first negative wire 214 is coupled to first negative contact 203*a* and a first negative jumper 215. The first portion of wire harness 202 also includes a first positive wire 216 that is coupled to a positive jumper 217. Coupling fork member 198*a* to body portion 12 brings first negative contact 203*ab* and first positive contact 204 into electrical connection with first negative jumper 215 and positive jumper 217, respectively.

A second portion of wire harness 202 extends from indicator light 212*b* through wire harness aperture 136 where a second negative wire 218 is coupled to second negative contact 205*a* and a second negative jumper 219. Coupling fork member 198*b* to body portion 12 brings second negative contact 205*b* and second positive contact 206 into electrical connection with second negative jumper 219 and positive jumper 217, respectively.

After coupling portion 14 has been engaged to latch mechanism 32, closure member 28 is slowly moved toward the closed position until gauging portion 16 contacts striker structure 36. If striker structure 36 is aligned to latch mechanism 32 within the predetermined tolerance, leg 108*a* is brought into contact with either or both of the first and second negative contacts 203*a* and 205*a* coupled to central portion 194 as illustrated in FIG. 7*a* and neither indicator light 212*a* or 212*b* illuminates. If striker structure 36 is marginally aligned to latch mechanism 32 such that the alignment is slightly outside the predetermined tolerance, leg 108*a* is brought into contact with one of the fork members 198 and the central portion 194. For example, if striker structure 36 is positioned high relative to latch mechanism 32, leg 108*a* of striker structure 36 will contact fork member 198*a* and central portion 194 as illustrated in FIG. 7*b*, thus completing an electrical circuit and permitting indicator light 212*a* to illuminate and provide an indication to the technician that an out-of-tolerance condition exists.

Similarly, if striker structure 36 is positioned low relative to latch mechanism 32, leg 108*a* of striker structure will contact fork member 198*b* and central portion 194, thus completing an electrical circuit and permitting indicator light 212*b* to illuminate and provide an indication to the technician that an out-of-tolerance condition exists. The use of indicator lights 212*a* and 212*b* permits the technician to quickly and ergonomically identify the direction of the misalignment between the striker structure 36 and the latch mechanism 32.

If striker structure 36 is significantly misaligned to latch mechanism 32, leg 108*a* will not fit between the fork members 198 but rather will contact the end 222 of one of the fork members 198. For example, as illustrated in FIG. 7*c*, if striker structure 36 is positioned sufficiently low relative to latch mechanism 32, leg 108*a* of striker structure will contact fork member 198*b*, thus completing an electrical circuit between second negative contact 205*b* and second positive contact 206 and permitting indicator light 212*b* to illuminate and provide an indication to the technician that an out-of-tolerance condition exists.

Similarly, if striker structure 36 is positioned high relative to latch mechanism 32, leg 108*a* of striker structure 36 will contact fork member 198*a*, thus completing an electrical circuit between first negative contact 203*b* and first positive contact 204 and permitting indicator light 212*a* to illuminate and provide an indication to the technician that an out-of-tolerance condition exists.

As tool 10 will typically be used on both sides of vehicle 20, an additional pair of indicator lights 212 or various other devices, such as light pipes or fiber-optic units may be incorporated into body portion 12 to permit a technician to view the indicator lights regardless of the orientation of tool 10. Additional indicator lights may also be incorporated into tool 10 which illuminate upon detecting that striker structure 36 is properly aligned.

Figure 10:
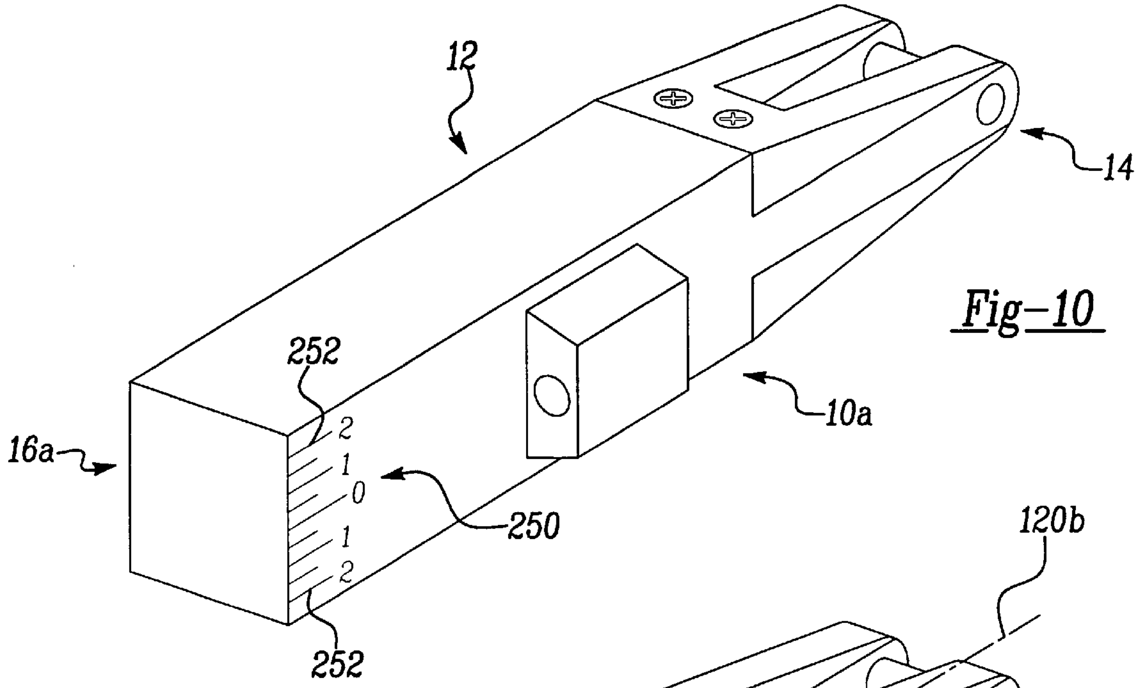
FIG. 10 is a view of a tool constructed in accordance with a first alternate embodiment of the present invention.

While the tool of the present invention has been described thus far as a self-contained checking device having an electronic gauging portion, those skilled in the art will appreciate that the invention, in its broader aspects, may be constructed somewhat differently. For example, as illustrated in FIG. 10, the tool of the present invention may include a scale 250 with a plurality of graduations 252 which permit the technician to determine the magnitude with which the striker structure 36 is misaligned.

Figure 11:
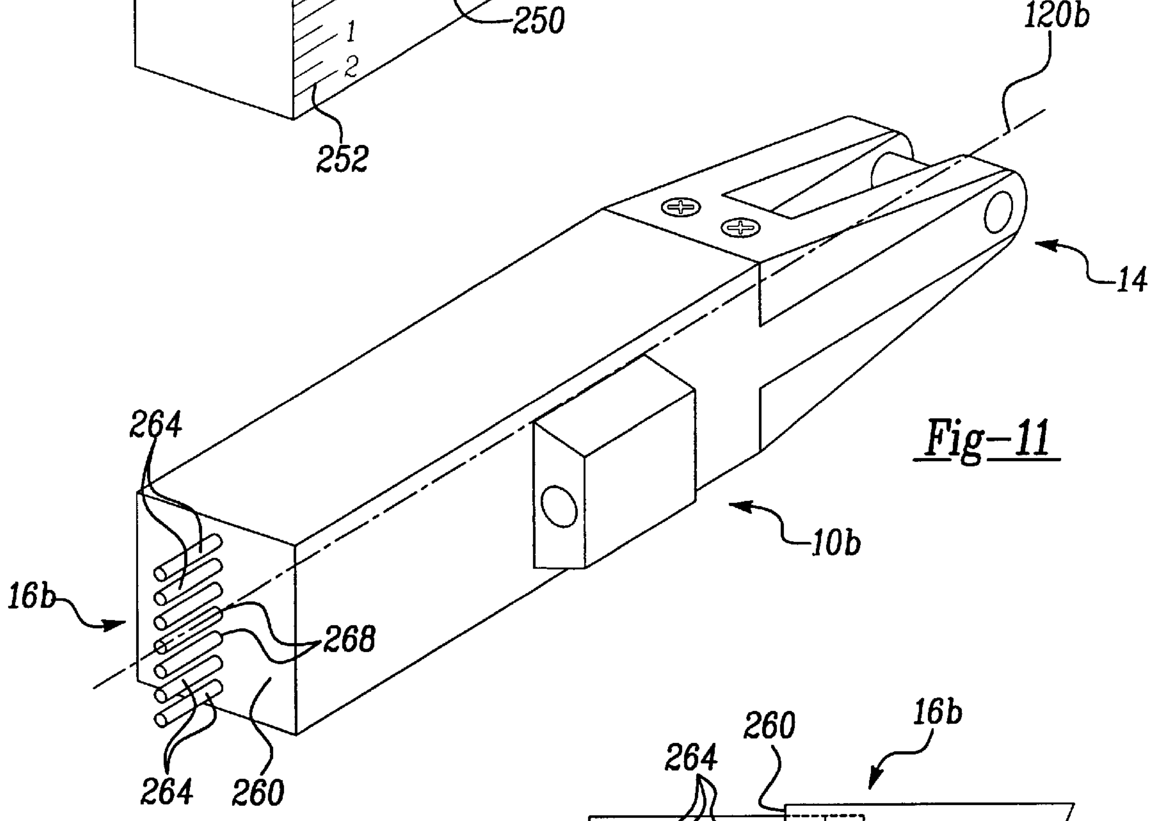
FIG. 11 is a view of a tool constructed in accordance with a second alternate embodiment of the present invention.
Figure 12:
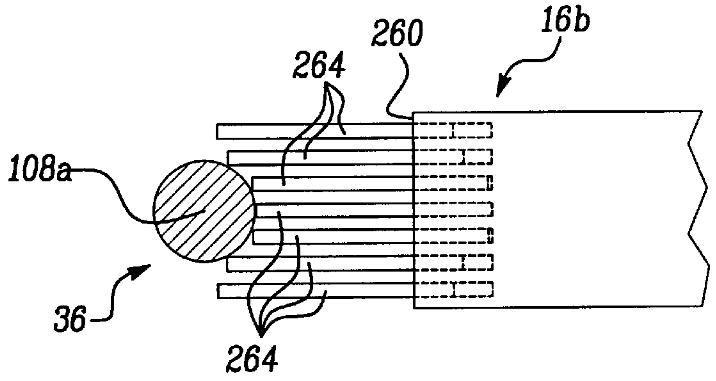
FIG. 12 is a view of the tool of FIG. 11 operatively associated with a striker structure.

Another example is illustrated in FIGS. 11 and 12 where the gauging portion 16*b* of tool 10*b* includes a base portion 260 and a plurality of pin members 264. Base portion 260 includes a plurality of pin apertures 268 wherein each of the plurality of pin apertures 268 is positioned parallel to primary axis 120*b*. Each of the plurality of pin members 264 are disposed in a pin aperture 268 and slidingly positionable between an extended position as illustrated in FIG. 11 and a retracted position as partially illustrated in FIG. 12. The plurality of pin members 264 are adapted to slide out of the extended position in response to contact with leg 108*a* of striker structure 36 to provide an indication of the magnitude by which the striker structure 36 is offset from the primary axis 120*b*.

Figure 13:
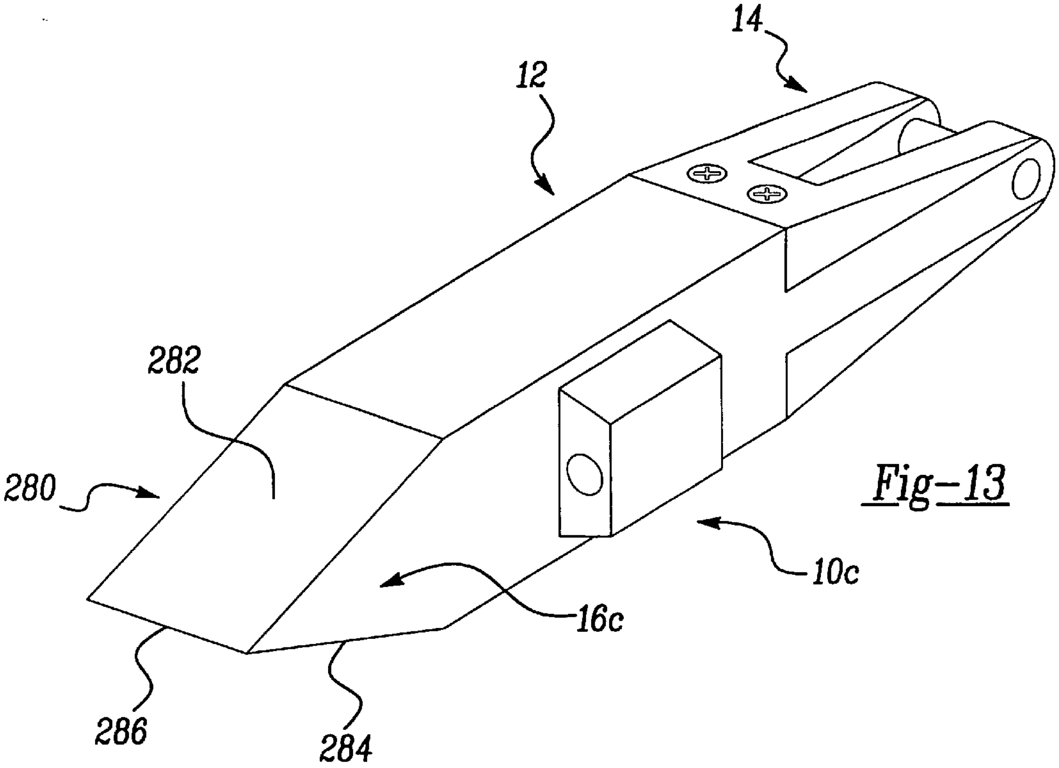
FIG. 13 is a view of a tool constructed in accordance with a third alternate embodiment of the present invention.

Yet another example is illustrated in FIG. 13. Gauging portion 16*c* is shown to terminate in a wedge 280 defined by the upper and lower surfaces 282 and 284, respectively, of gauging portion 16*c*. Upper and lower surfaces 282 and 284 terminate at a sharp point 286 which provides a sighting edge to assist the technician in determining whether striker structure 36 is misaligned to latch mechanism 32.

Figure 14:
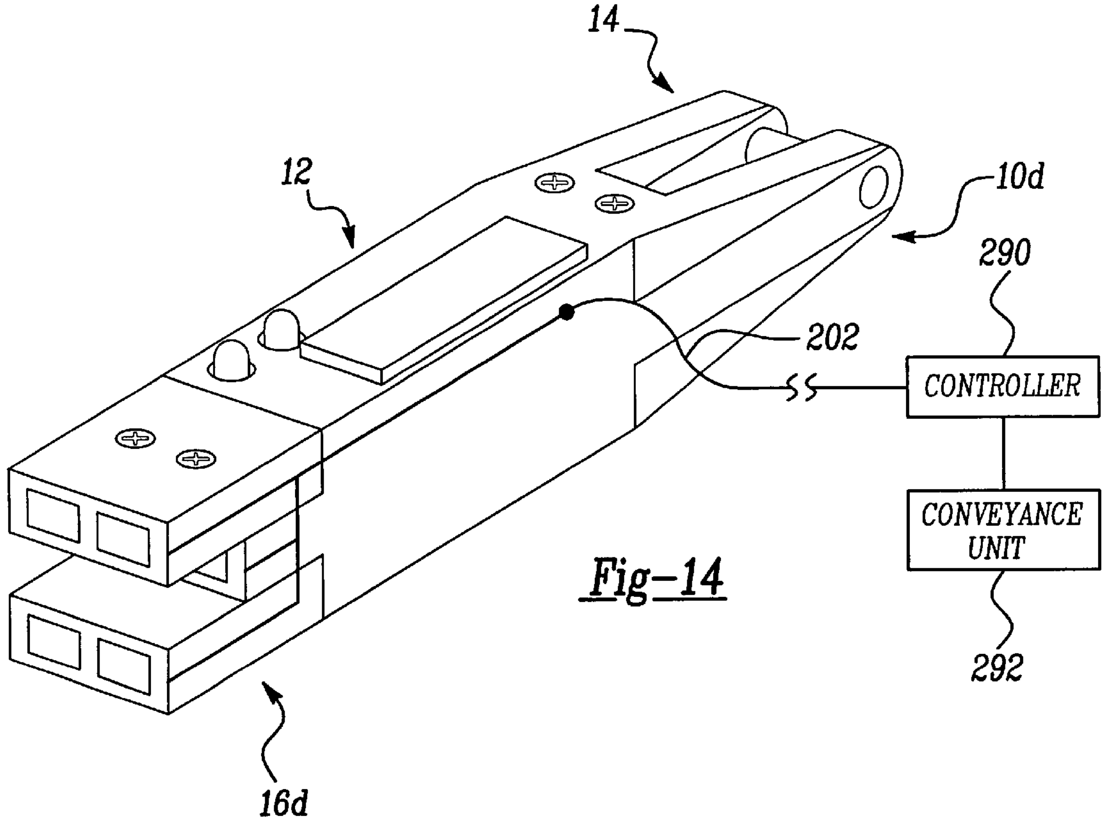
FIG. 14 is a view of a tool constructed in accordance with a fourth alternate embodiment of the present invention.

A further example is illustrated in FIG. 14. Tool 10*d* includes a gauging portion 16*d* which is coupled to a controller 290. Controller 290 is operable for monitoring various attributes of a vehicle 20 as it is assembled on a conveyance unit 292. Gauging portion 16*d* is configured to provide a gauging signal in response to contact between gauging portion 16*d* and striker structure 36. If striker structure 36 is aligned to latch mechanism 32 within the predetermined tolerance, a first gauging signal is produced indicative of the acceptable positioning of striker structure 36. If striker structure 36 is not aligned to latch mechanism within the predetermined tolerance, a second gauging signal is produced indicative that striker structure 36 has not been properly positioned. Automatic recording of such information by controller 290 provides a tracking record of each vehicle having a defect and prevents vehicles from leaving the assembly plant with an improperly aligned striker structure 36.

Figure 15:
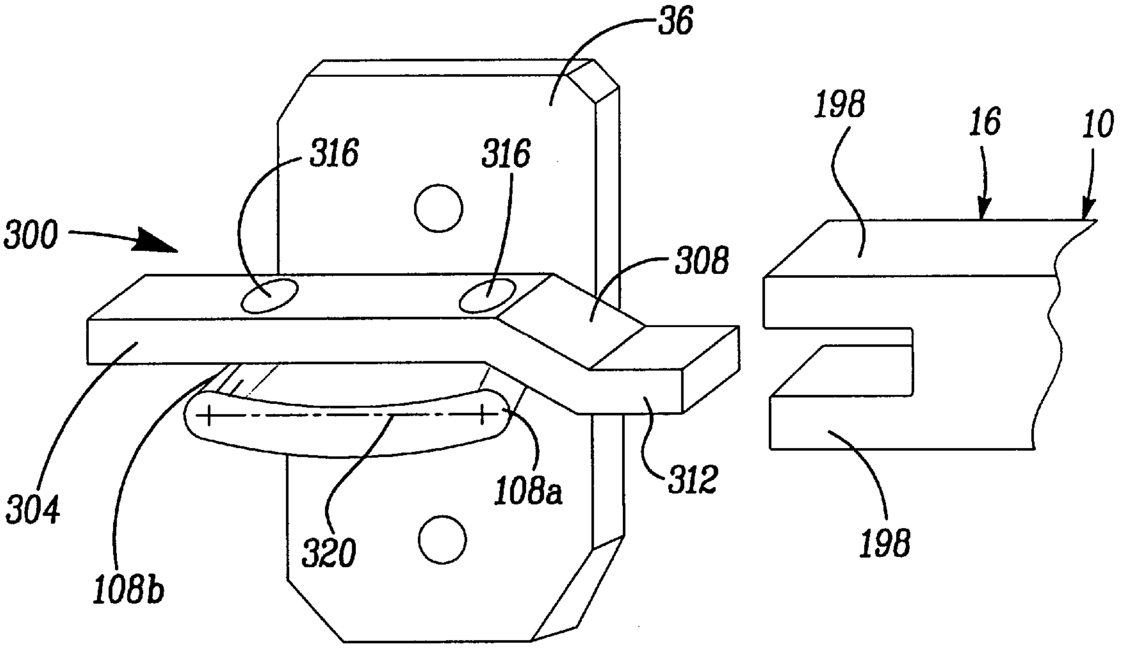
FIG. 15 is a perspective view of a tool constructed in accordance with a fifth alternate embodiment of the present invention.

Another embodiment of the present invention is illustrated in FIG. 15 wherein a offsetting member 300 is shown in operative association with striker structure 36 and tool 10. Offsetting member 300 includes a body portion 304, a transition portion 308 and a gage adapter portion 312. Body portion 304 and transition portion 308 are configured to employ the legs 108 of striker structure 36 as datums to align gage adapter portion 312 in a predetermined relationship thereto. In the particular embodiment illustrated, body portion 304 includes a pair of magnets 316 which releasably retain offsetting member 300 to striker structure 36. Alternatively, clips or other devices may also be used to releasably retain offsetting member 300 to striker structure 36. Gage adapter portion 312 has a thickness which approximates the diameter of the legs 108 which permits it to be received between the fork members 198 of gage portion 16. As offsetting member 300 tends to magnify any angular offset of the axis 320 between legs 108, it is particularly useful to ensure that the leg 108*a* of striker structure 36 is located in the proper position and that the leg 108*b* is not excessively rotated relative to leg 108*a*.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A tool for checking the alignment of a striker structure to a closure member having a latch mechanism, the tool comprising:

a body portion having a primary axis;

a coupling portion coupled to the body portion and having a beam member and a tool centering structure, the beam member adapted to engage a latch ratchet, the tool centering structure adapted to engage one of the latch mechanism and the closure member such that the body portion is maintained in a predetermined orientation relative to the latch ratchet; and a gauging portion adapted to contact the striker structure and permit the position of the striker structure to be gauged relative to a predetermined axis of the tool.

2. The tool of claim 1, wherein the gauging portion includes a generally U-shaped structure having a central portion and a pair of fork members, the pair of fork members spaced apart a predetermined distance and adapted to contact the striker structure when the striker structure is offset to the predetermined axis of the tool in excess of a predetermined offset amount.

3. The tool of claim 2, further comprising an indicator portion, the indicator portion coupled to the gauging portion and including at least one indicator light, the indicator light adapted to illuminate in a predetermined manner in response to contact between the striker structure and either of the pair of fork members.

4. The tool of claim 3, wherein the at least one indicator light is maintained at least temporarily in an illuminated condition and transforms to an unilluminated condition in response to contact between the striker structure and either of the pair of fork members.

5. The tool of claim 3, wherein the at least one indicator light is maintained in an unilluminated condition and transforms to an illuminated condition in response to contact between the striker structure and the base member when neither of the pair of fork members is in contact with the striker structure.

6. The tool of claim 1, wherein the gauging portion includes a scale having a plurality of spaced apart graduations.

7. The tool of claim 1, wherein the tool centering structure includes a pair of engagement surfaces, each of the pair of engagement surfaces tapering inwardly from the body portion toward the longitudinal axis of the beam member, the pair of engagement surfaces adapted to contact one of the latch mechanism and the closure member when the beam member is engaged to the latch ratchet and align the predetermined axis to the latch ratchet in a predetermined manner.

8. The tool of claim 7, wherein the pair of engagement surfaces are adapted to engage a guide chute in the latch mechanism.

9. The tool of claim 1, wherein the gauging portion includes a base portion and a plurality of pin members, the base portion having a plurality of pin apertures, each of the plurality of pin apertures parallel to the predetermined axis, each of the plurality of pin members disposed in a pin aperture and slidingly positionable between an extended position and a retracted position, the plurality of pin members adapted to slide out of the extended position in response to contact with the striker structure to provide an indication of the magnitude by which the striker structure is offset from the predetermined axis.

10. The tool of claim 1, further comprising an offsetting member having a body portion, a transition portion and a gage adapter portion, the body portion adapted for contacting the striker structure and aligning the gage adapter portion in a predetermined manner, the gauging portion of the tool operable for contacting the gage adapter portion to gage the position and angularity of the striker structure relative to a predetermined axis of the tool.

11. A tool for checking the alignment of a striker structure to a closure member having a latch mechanism, the tool comprising:

- a body portion;
- a first end portion coupled to the body portion and adapted for coupling the tool to the latch member and positioning the body portion in a predetermined orientation; and
- a second end portion coupled to a distal end of the body portion and having a controls portion, the controls portion adapted to electronically determine whether the striker structure is aligned to the latch mechanism within a predetermined tolerance.

12. The tool of claim 11, wherein the controls portion includes at least one indicator light adapted to illuminate in a predetermined manner in response to determining that the striker structure has not been aligned to the latch mechanism within the predetermined tolerance.

13. The tool of claim 11, wherein the controls portion produces an alignment signal indicative of an alignment condition of the striker structure to the latch mechanism, the alignment signal adapted to be transmitted to a vehicle conveyor control means to permit the alignment condition to be documented.

14. The tool of claim 11, further comprising an offsetting member having a body portion, a transition portion and a gage adapter portion, the body portion adapted for contacting the striker structure and aligning the gage adapter portion in a predetermined manner, the gauging portion of the tool operable for contacting the gage adapter portion to gage the position and angularity of the striker structure relative to a predetermined axis of the tool.

15. A method for verifying the alignment of a striker structure to a latch mechanism, the method comprising the steps of:

- providing a vehicle structure having a vehicle body and a closure member, the vehicle body defining a door aperture, the closure member including a latch mechanism having a guide chute and a latch ratchet, the closure member pivotably coupled to the vehicle body and positionable in an open position wherein the closure member substantially clears the door aperture, and a closed position substantially closing the door aperture, the vehicle body having a striker structure adapted to engage the latch ratchet when the closure member is positioned in the closed position;
- providing a tool having a body portion, a coupling portion and a gauging portion, the tool having a predetermined axis, the coupling portion coupled to the body portion and having a beam member and a tool centering structure;
- coupling the tool to the latch mechanism such that the beam member engages the latch ratchet and the tool centering structure engages the guide chute;
- rotating the closure member toward the closed position until the gauging portion of the tool contacts the striker structure;
- determining whether the striker structure is offset from the predetermined axis of the tool in excess of a predetermined offset amount.

16. The method of claim 15, wherein the step of determining whether the striker structure is offset from the primary axis includes the steps of:

- providing the gauging portion with a gauging circuit having first and second electrical contacts;
- providing an sensor signal adapted to be conducted through the striker structure when the striker structure is positioned in a predetermined manner relative to the predetermined axis;
- providing an indicator which communicates whether the sensor signal has been conducted through the striker structure.

17. The method of claim 16, wherein the indicator is a light-emitting diode.

* * * * *